E. K. COLLINS.
Clover Bolt.
No. 1,690. Reissued June 7, 1864.
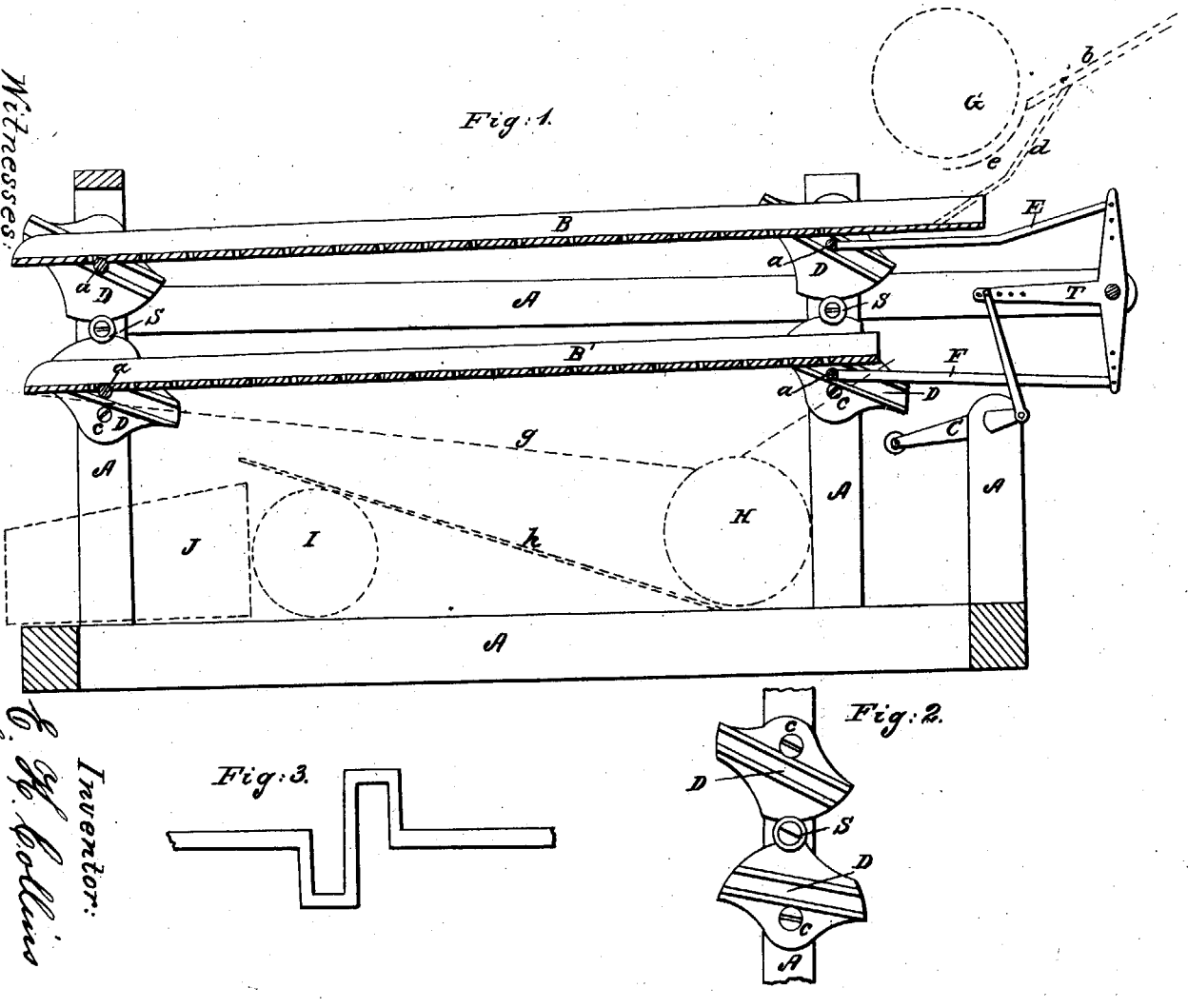
Witnesses:
R. D. O. Smith.
Geo. C. Lambright.
Inventor:
E. K. Collins
By his atty.
Wm. S. Loughborough.
N. PETERS, Photo-Lithographer, Washington, D. C.

UNITED STATES PATENT OFFICE.

EDWARD K. COLLINS, OF CHILI, NEW YORK.

IMPROVEMENT IN CLOVER-BOLTS.

Specification forming part of Letters Patent No. 25,097, dated August 16, 1859; Reissue No. 1,690, dated June 7, 1864.

*To all whom it may concern:*

Be it known that I, EDWARD K. COLLINS, of Chili, in the county of Monroe and State of New York, have invented a new and useful Improvement in Clover Thrashing, Separating, Hulling, and Cleaning Machines; and I do hereby declare that the following is a full, clear, and exact description thereof, reference being had to the accompanying drawings, making a part of this specification, in which—

Figure 1 is a vertical longitudinal section of my invention. Fig. 2 is a side elevation of two of the adjustable inclined grooves D, and showing one more inclined than the other. Fig. 3 shows a portion of a double crank-shaft which may be substituted for the T.

Similar letter of reference indicate corresponding parts in each figure.

The nature of my invention consists, mainly, in providing the two single bolts used in clover-machines with a counter movement whereby each thoroughly prevents the other from clogging, and the momentum of each is counteracted by that of the other, so that the machine is not shaken about as it is when the two bolts are connected in one frame and move together, as heretofore practiced.

To enable others to make and use my invention, I will describe its construction and operation.

The several letters A in the drawings represent the frame; B and B′, the two single bolts; C, the driving-crank that works the T; D, the adjustable inclined grooves in which the bolts are supported and operated. The red circle G represents the thrashing-cylinder; H, the huller; I, the fan, and J the fanning-mill shoe.

I construct the bolts B and B′ similar to the ordinary double bolts, the perforations of the upper one, B, being considerably coarser than those of the other. Each end of the bolts may be provided with a cross-rod, *a*, the ends of which project into the grooves D, or there may be studs attached to the sides of the bolts, so as to reach into the grooves, and so answer the same purpose of the rods.

By means of the inclined grooves D there is an alternately rising and falling motion imparted to the bolts at each revolution of the crank shaft.

As may be seen in Fig. 2, the plates of the grooves D are pivoted to the frame by the screw *c*, and they may be inclined more or less, as desired, by loosening the clamping-screw *s*. Various other devices may be substituted for these adjustable grooves.

The object of having several holes in the arms of the T was that the horizontal vibration or throw of either or both of the bolts might be increased or diminished, if found desirable. A double crank, as shown in Fig. 3, may be substituted for the T.

The clover to be thrashed is supplied to the the thrashing-cylinder G from the feed-board *b*, and is discharged upon the upper bolt, B, such portions as may work through the concave *e* being conducted thereon by the chute-board *d*, and all the bolls and finer substances, and, unavoidably, more or less of the finer straws, work through the upper bolt; but the second bolt, B′, separates all the straws, depositing the bolls or capsules upon the chute-boards *f* and *g*, which convey them to the hulling-cylinder H. The seeds and hulls are carried, by a belt running over the board *h*, from the huller to the shoe J of the fanning-mill.

What I claim as my invention, and desire to secure by Letters Patent, is—

Giving the counter movement longitudinally to the two single bolts B and B′ when used in combination with the thrashing and hulling cylinders of clover-machines, whether said bolts have an alternately rising and falling motion, or not.

ED. K. COLLINS.

Witnesses:

WM. S. LAUGHBOROUGH,

J. L. RE QUA.